United States Patent [19]

Cheung et al.

[11] Patent Number: 4,776,905
[45] Date of Patent: Oct. 11, 1988

[54] METHOD AND APPARATUS FOR PRODUCING A WELDED JOINT IN THERMOPLASTIC STRAP

[75] Inventors: Nelson Cheung, Arlington Heights; Robert J. Kobiella, Rolling Meadows, both of Ill.

[73] Assignee: Signode Corporation, Glenview, Ill.

[21] Appl. No.: 871,693

[22] Filed: Jun. 6, 1986

[51] Int. Cl.⁴ .................. B65B 13/32; B29C 65/06
[52] U.S. Cl. ............................ 156/73.5; 53/399; 53/589; 100/33 PB; 156/212; 156/309.6; 156/495; 156/502; 156/580
[58] Field of Search ............... 100/33 PB; 156/73.5, 156/580, 502, 212, 73.1, 73.4, 495, 309.6, 580.1, 580.2; 53/399, 589

[56] References Cited

U.S. PATENT DOCUMENTS

| | | | |
|---|---|---|---|
| Re. 31,353 | 8/1983 | Cheung | 100/33 PB |
| 3,331,312 | 7/1967 | Leslie et al. | 100/28 |
| 3,442,203 | 5/1969 | Kobiella | 100/33 PB |
| 3,442,732 | 5/1969 | Stensaker et al. | 100/33 PB |
| 3,442,733 | 5/1969 | Vilcins | 156/73.5 |
| 3,442,734 | 5/1969 | Ericsson | 156/73.5 |
| 3,442,735 | 5/1969 | Stensaker | 156/73.5 |
| 3,492,367 | 1/1970 | Starkweather | 156/73.5 |
| 3,548,740 | 12/1970 | Kobiella | 100/33 PB |
| 3,554,845 | 1/1971 | Billet et al. | 156/580 |
| 3,554,846 | 1/1971 | Billet | 156/580 |
| 3,561,350 | 2/1971 | Dorney et al. | 156/73.5 |
| 3,586,572 | 6/1971 | Ericsson | 156/515 |
| 3,669,799 | 6/1972 | Vilcins et al. | 156/73.5 |
| 3,799,835 | 3/1974 | Gilmore | 156/73.5 |
| 3,984,278 | 10/1976 | Styner et al. | 156/522 |
| 3,996,403 | 12/1976 | Gould et al. | 100/33 PB |
| 4,050,372 | 9/1977 | Kobiella | 156/73.5 |
| 4,062,278 | 12/1977 | Cheung | 100/33 PB |
| 4,119,449 | 10/1978 | Gould et al. | 100/33 PB |
| 4,153,499 | 5/1979 | Annis | 100/33 PB |
| 4,158,711 | 6/1979 | Gould | 428/57 |
| 4,247,591 | 1/1981 | Gould | 428/212 |
| 4,300,976 | 11/1981 | Wehr | 156/502 |
| 4,305,774 | 12/1981 | Wedeking et al. | 156/73.5 |
| 4,313,779 | 2/1982 | Nix | 156/361 |
| 4,378,262 | 3/1983 | Annis, Jr. | 156/73.5 |
| 4,450,032 | 9/1984 | Kobiella | 156/73.5 |
| 4,479,834 | 10/1984 | Kobiella | 156/73.5 |
| 4,482,421 | 11/1984 | Gurak | 156/580.1 |
| 4,483,438 | 11/1984 | Kobiella | 100/33 PB |
| 4,512,844 | 4/1985 | Kobiella | 156/510 |

FOREIGN PATENT DOCUMENTS 2521474 1/1977 Fed. Rep. of Germany .
49-4520 2/1974 Japan .

OTHER PUBLICATIONS

Freres, Robert N., "Fabricating With Friction Heat," *Modern Plastics*, pp. 142–144, Nov. 1943.
Asnisimova, A. P. and R. I. Zakson., "The Vibro-Friction Welding of Plastics," *Svar. Proiz.*, 1964, No. 8, pp. 23–24, (English pp. 45–48).
Article entitled "Strapping Welded by Friction" published in *The Iron Age*, Jul. 7, 1966, on p. 72.
"Operation, Parts and Safety Manual Signode Spirit TM Strapping Machine", published by Signode Corporation, 2600 West Lake Avenue, Glenview, Ill., 60025, under the designation 286022 Copyright ® Signode Corp., 8/85.

*Primary Examiner*—Michael Wityshyn
*Attorney, Agent, or Firm*—Dressler, Goldsmith, Shore, Sutker & Milnamow, Ltd.

[57] ABSTRACT

A method and apparatus is provided for securing together overlapping portions of a thermoplastic strap loop around an object. The overlapping strap portions are forced together in face-to-face contact under pressure. During or before the step of forcing the strap portions together, the energy in the strap portions is increased so as to melt at least a part of the thickness of each strap portion at the interface region. One embodiment of the method also includes forming a plurality of cavities that are distributed across the width of the molten parts adjacent the ends of the molten parts and that are surrounded by the molten parts. The step of increasing the energy is then terminated, and the strap portions at the interface region subsequently solidify, to encapsulate the cavities and form the welded joint. In another, and preferred, embodiment of the invention, the pressure on the strap portions is released while the parts of the strap portions are molten (whether or not cavities are present), and the strap portions at the interface region subsequently solidify in the absence of pressure.

20 Claims, 6 Drawing Sheets

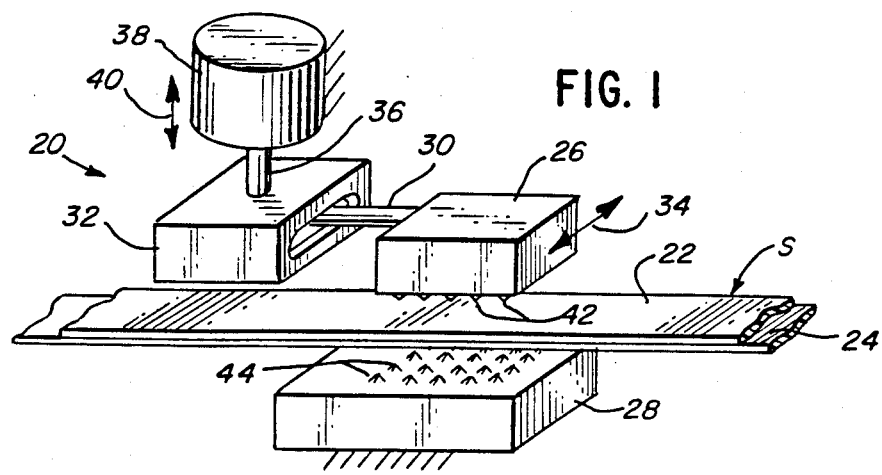
FIG. 1
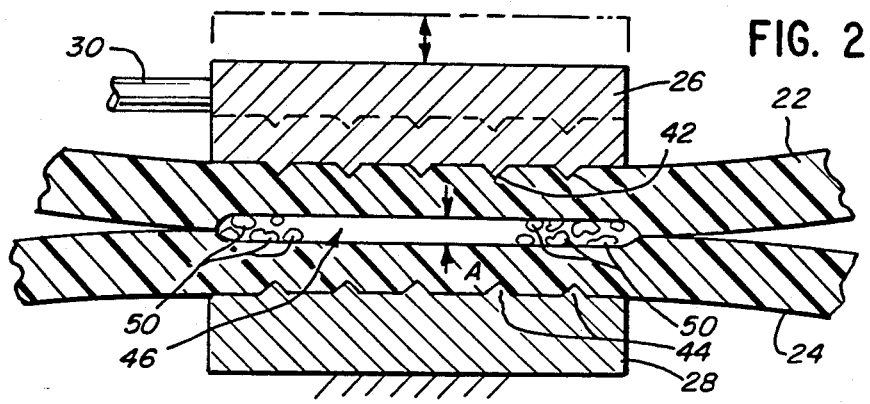
FIG. 2
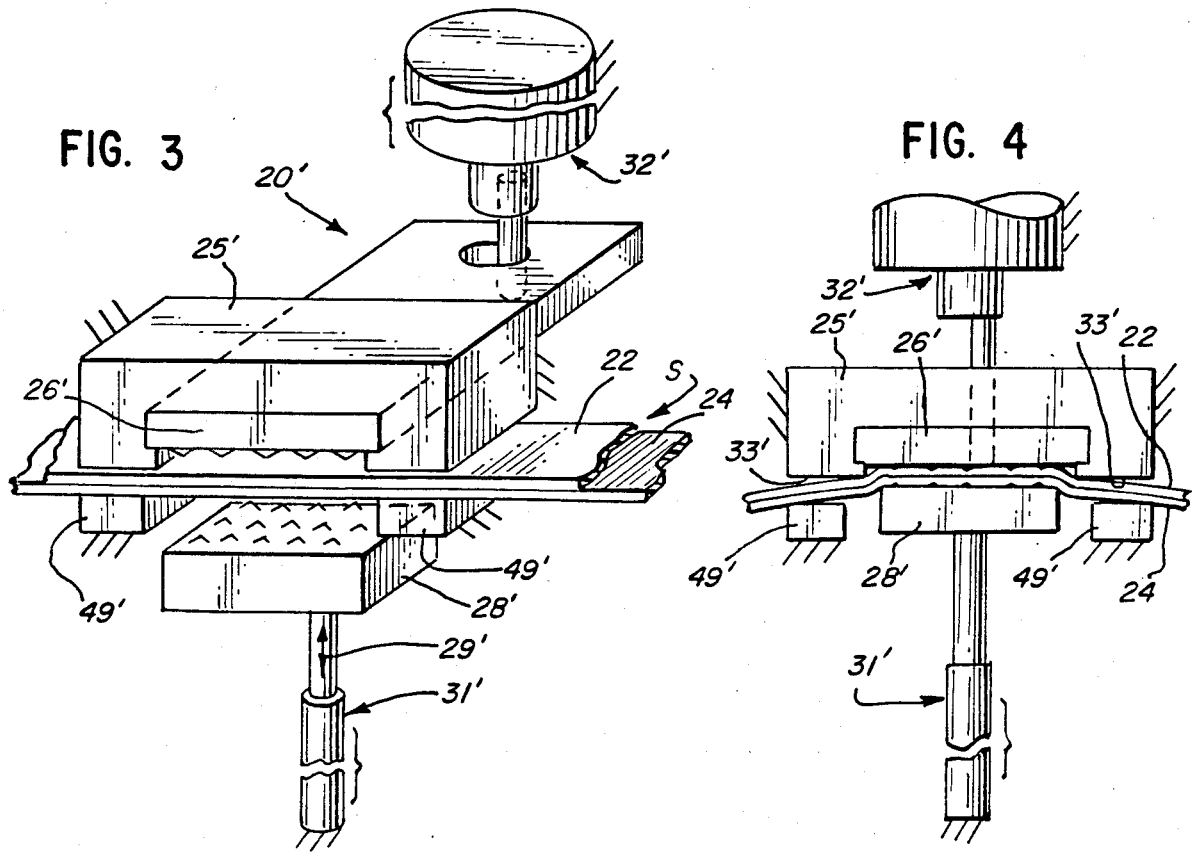
FIG. 3
FIG. 4

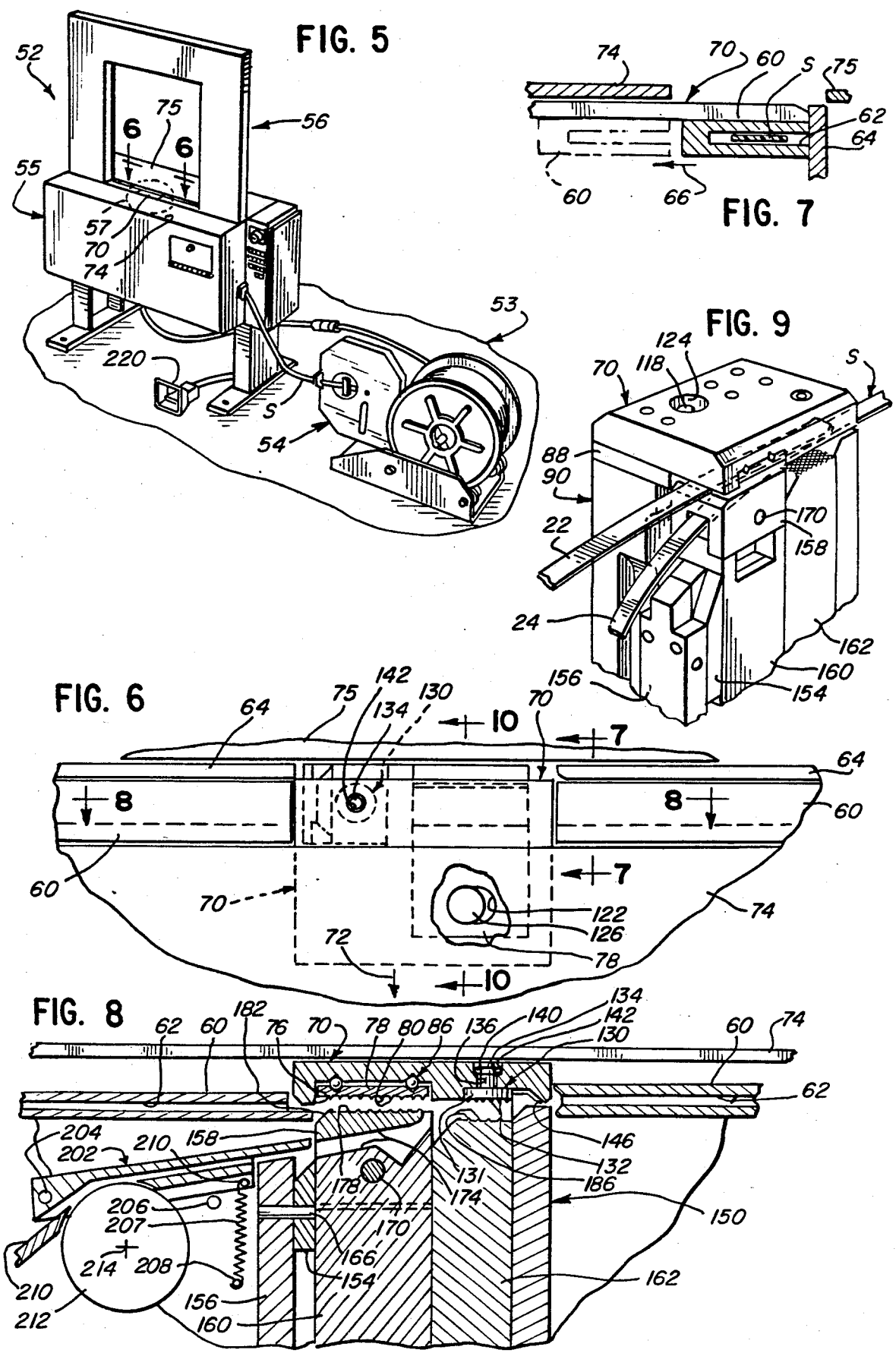

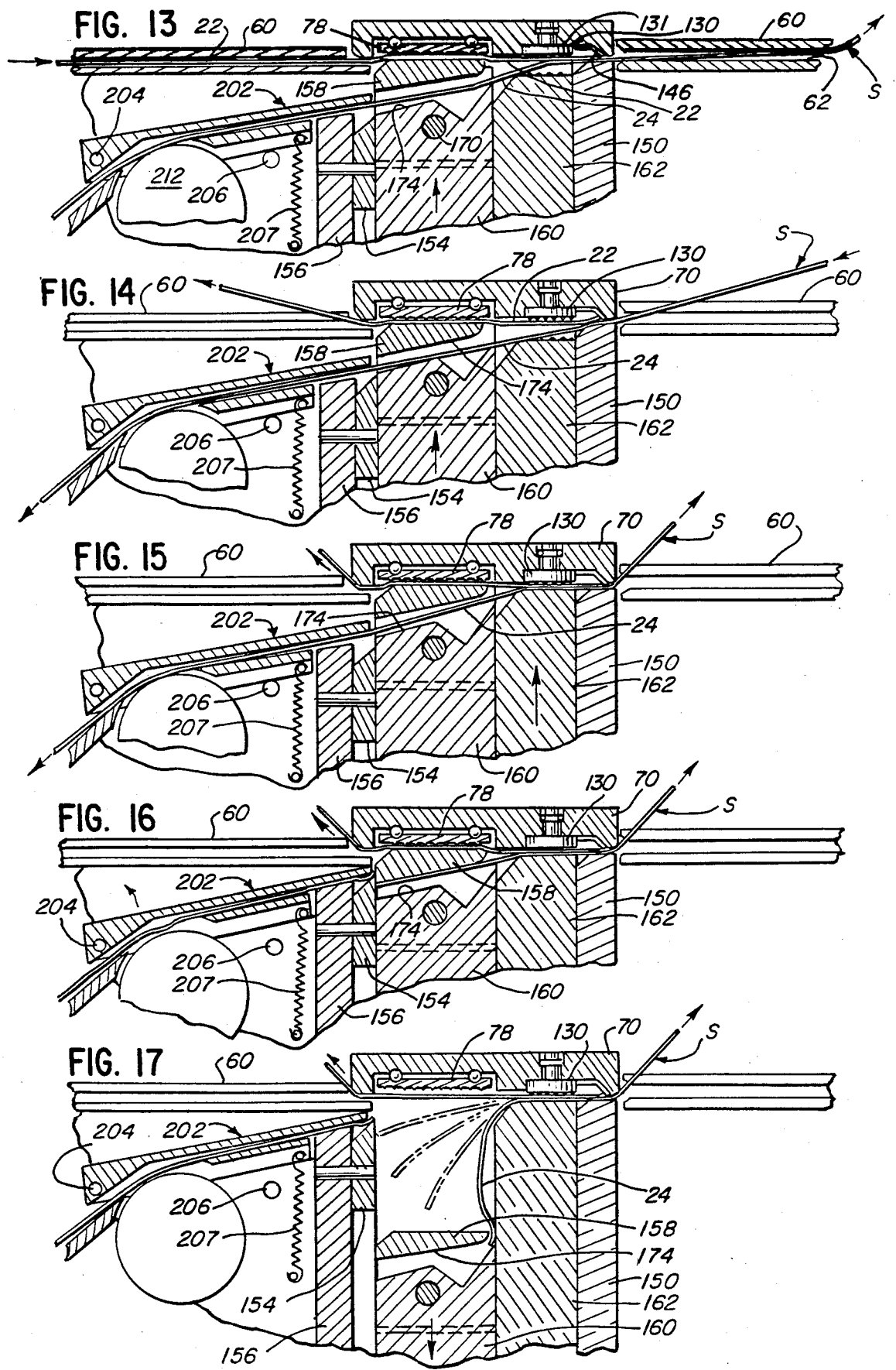

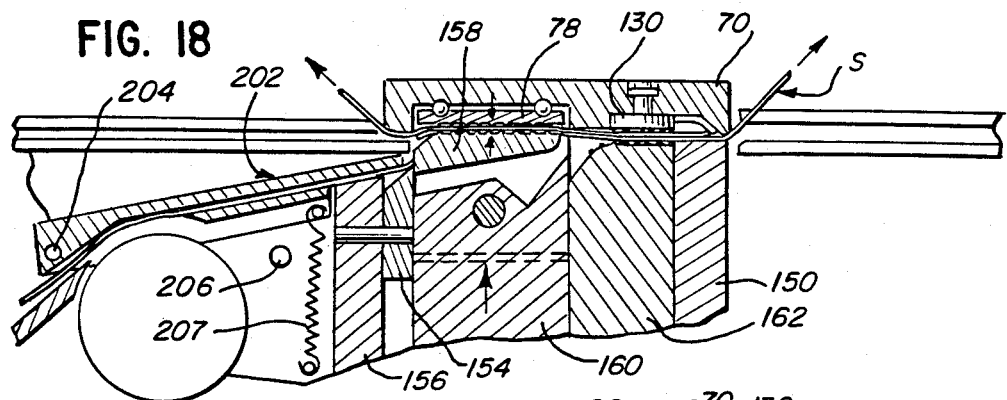
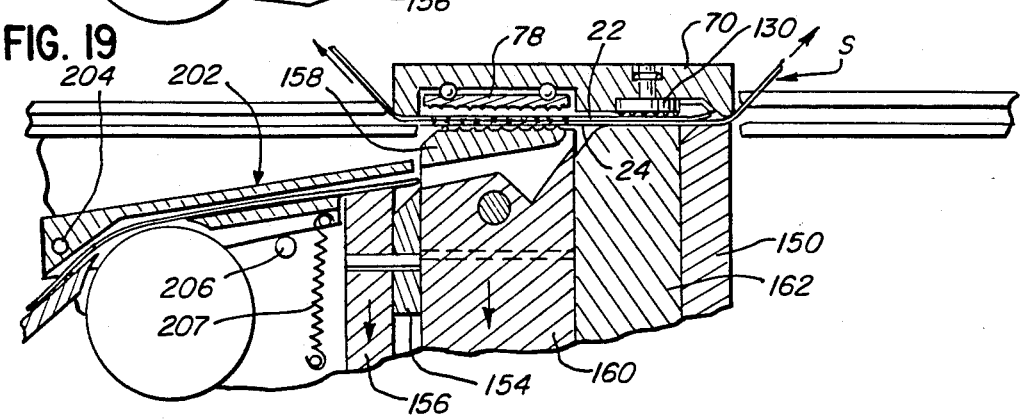
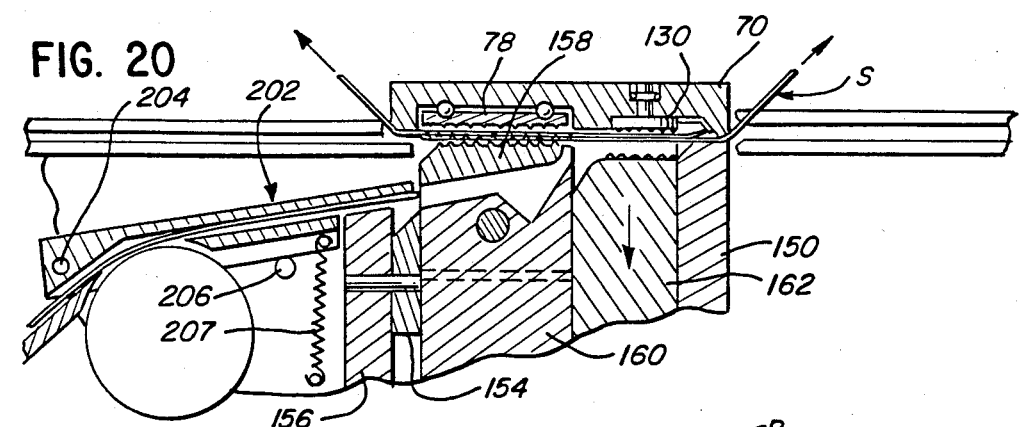
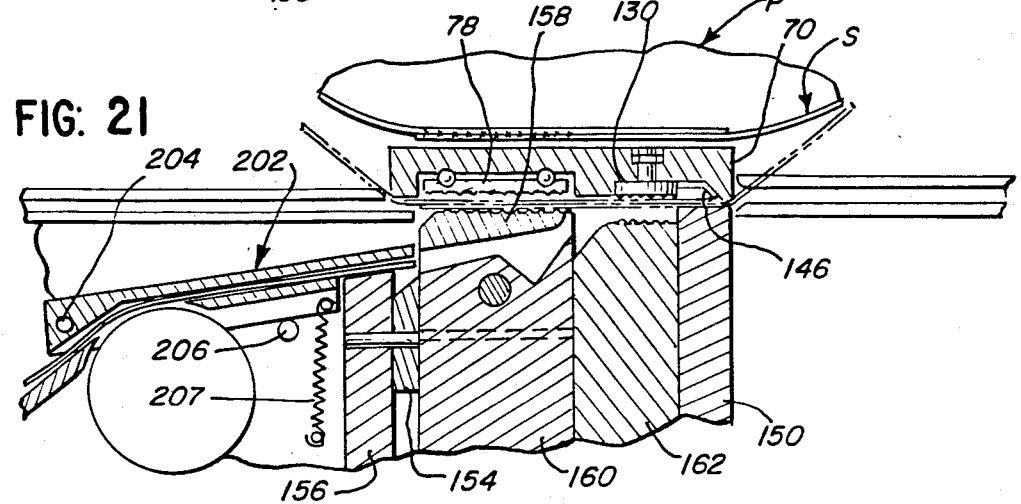

METHOD AND APPARATUS FOR PRODUCING A WELDED JOINT IN THERMOPLASTIC STRAP

TECHNICAL FIELD

This invention relates to apparatus and methods for securing together overlapping portions of thermoplastic sheet material, especially strap used to bind articles.

BACKGROUND OF THE INVENTION AND TECHNICAL PROBLEMS POSED BY THE PRIOR ART

A variety of processes have been marketed and/or proposed over the years for welding together overlapping portions of a tensioned loop of thermoplastic strap encircling an article. One process employs a heated member to melt a surface layer of each of the strap portions which are then pressed together while the layers merge and cool to form a solidified weld.

In a different process, the strap portions are pressed together, and a layer of each strap portion at the interface is melted by means of ultrasonic energy. The layers then cool and solidify while the overlapping strap portions remain pressed together.

Another process is effected by first pressing the overlapping strap portions together and then creating a unidirectional or multidirectional bodily sliding frictional movement between the contacting surfaces of the overlapping strap portions so as to melt the interface region of the overlapping strap portions. The melted interface region is allowed to solidify at rest, but under pressure, so as to bond the overlapping strap portions together.

The last discussed process, which can be generally designated as friction-fusion welding or friction welding, has proven to be especially effective with conventional thermoplastic strap materials such as nylon, polyester, and polypropylene Such conventional strap is typically provided commercially in widths ranging from about 5 mm. to about 13 mm. and in thicknesses ranging between about 0.25 mm. and about 0.89 mm.

Conventionally produced welded joints in thermoplastic strap have found wide commercial acceptance in many applications. However, a conventional welded joint is typically the weakest part of a tensioned strap loop secured about a package or other object. There is a continuing need for methods and apparatus capable of producing routinely and consistently, and in an economic manner, a welded joint that has greater strength than conventional welded joints in various types of strap. Specifically, it is desired to produce a welded joint that has a strength that approaches, as close as possible, the tensile strength of the strap.

One aspect of the present invention is the discovery that, with certain types of strap, a welded joint can be produced with a unique internal configuration that provides an improved joint with greater strength.

The above-discussed techniques for producing a welded joint in overlapping strap portions typically employ apparatus for continuing to press the strap portions together under pressure while the melted interface layers of the straps cool and solidify. Although this can produce a satisfactory joint, a discovery has been made that it would be desirable to provide an improved method and apparatus for making a welded joint in overlapping strap portions wherein the strap portions are not pressed together as the melted strap layers cool and solidify. This has an advantage, in friction-fusion welding, that the cooling and solidifying strap portions will not be disturbed by the vibrating member as its vibration amplitude is damped to zero upon termination of the welding step.

One related aspect of the present invention is the discovery that, with certain types of strap, the above-discussed higher strength welded joint can be made under the above-described conditions wherein, inter alia, the strap portions are not pressed together after the interface layers have melted and wherein the melted layers are permitted to cool and solidify in the absence of such pressure.

SUMMARY OF THE INVENTION

According to a preferred embodiment of the method of the present invention, overlapping portions of thermoplastic strap are forced together in face-to-face contact under pressure. During or before the step of forcing the strap portions together, the energy in the strap portions is increased so as to melt at least a part of the thickness of each strap portion at the face of each strap portion. The method also includes forming a plurality of cavities that are distributed across the width of the molten parts adjacent the ends of the molten parts and that are surrounded by the molten parts. The step of increasing the energy is then terminated, and the strap portions at the interface region subsequently solidify to encapsulate the cavities and form the welded joint.

According to another aspect of the invention, a welding method can be employed wherein relative movement is effected between two strap-engaging members to engage the strap portions and force the strap portions into face-to-face contact under pressure at an interface region. The energy in the strap portions is increased at the interface region sufficiently to melt at least part of the thickness of each strap portion at the interface region. Then relative movement is effected between the two strap-engaging members to release the pressure on the strap portions while the parts of the strap portions are molten whereby the strap portions at the interface region subsequently solidify in the absence of pressure from the strap-engaging members to form the welded joint. Preferably, with some types of strap, cavities are formed and encapsulated within and across the weld adjacent the weld ends.

The invention includes apparatus for carrying out the above-described methods. One preferred form of the apparatus includes two strap-engaging members between which the strap portions can be positioned. A closing means is provided for effecting the relative movement between the two strap-engaging members to engage the strap portions and force the strap portions into face-to-face contact under pressure at the interface region. A means is provided for increasing the energy in the strap portions at the interface region sufficiently to melt at least part of the thickness of each strap portion at the interface region. In one preferred embodiment of the apparatus, the closing means subsequently functions as an opening means for effecting relative movement between the two strap-engaging members to release the pressure on the strap portions while the parts of the strap portions are still molten so that the strap portions at the interface region subsequently solidify in the absence of pressure from the strap-engaging members. Preferably, with some types of strap, cavities are formed and encapsulated within and across the weld adjacent the weld ends.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a simplified, substantially schematic, perspective view of one form of an apparatus which embodies features of the present invention and which is capable of effecting the methods of the present invention (it being realized that the size of the strap illustrated in this FIG. 1 and in the other Figures has been exaggerated in relationship to the apparatus components so that this relationship is not to scale and so that certain details may be more clearly illustrated);

FIG. 2 is a greatly enlarged, fragmentary, cross-sectional view of a portion of the apparatus in FIG. 1, but with the apparatus shown engaging overlapping strap portions while forming therebetween a welded joint (which is not shown to scale);

FIG. 3 is a simplified, substantially schematic, perspective view of a second embodiment of the apparatus which embodies features of the present invention and which is capable of effecting the methods of the present invention;

FIG. 4 is a fragmentary, side elevational view of a portion of the second embodiment of the apparatus but with the apparatus shown engaging overlapping strap portions while forming a welded joint therebetween;

FIG. 5 is a simplified, perspective view of the front of a proposed commerical strapping machine embodying a third, and preferred, form of the apparatus of the present invention;

FIG. 6 is a greatly enlarged, fragmentary, plan view taken generally along the plane 6—6 in FIG. 5;

FIG. 7 is a fragmentary, cross-sectional view taken generally along the plane 7—7 in FIG. 6;

FIG. 8 is a fragmentary, cross-sectional view taken generally along the plane 8—8 in FIG. 6;

FIG. 9 is a fragmentary, reduced, perspective view of the strap gripping and sealing assembly components of the apparatus as viewed from inside the machine and looking toward the front of the machine;

FIGS. 13-21 are simplified, cross-sectional views generally illustrating the sequence of operation of the machine, and, in particular, of the strap gripping and sealing assembly components.

DESCRIPTION OF THE PREFERRED EMBODIMENTS

Figure 10:
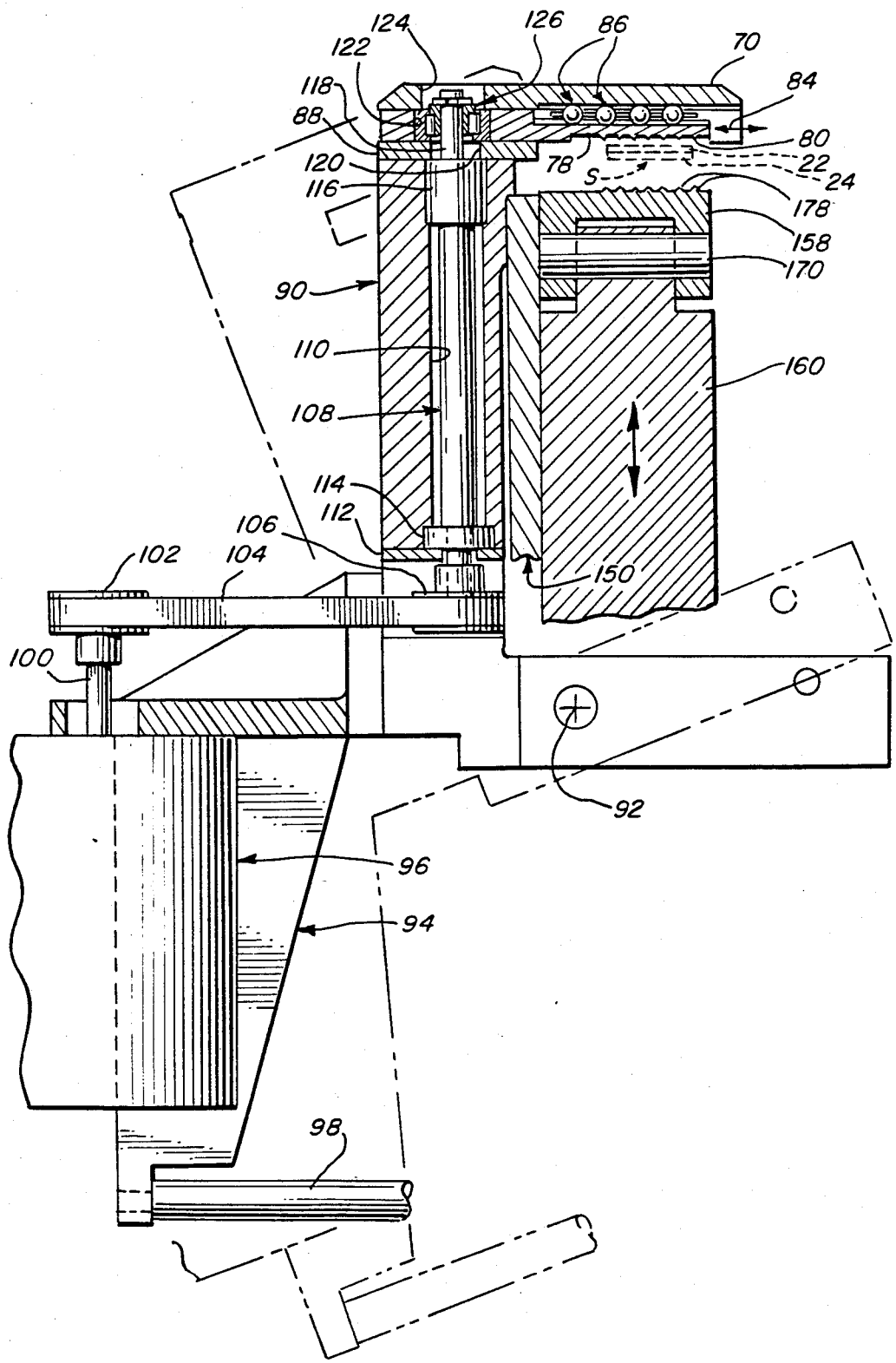
FIG. 10 is a fragmentary, cross-sectional view taken generally along the plane 10—10 in FIG. 6.

While this invention is susceptible of embodiment in many different forms, this specification and the accompanying drawings disclose only some specific forms as examples of the use of the invention. The invention is not intended to be limited to the embodiments so described, and the scope of the invention will be pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, used, and sold in an orientation other than the position described.

The apparatus of this invention is adapted to be used in a strapping machine with certain conventional components the details of which, although not fully illustrated or described, will be apparent to those having skill in the art and an understanding of the necessary functions of such components.

Some of the figures illustrating the embodiments of the apparatus show structural details and mechanical elements that will be recognized by one skilled in the art. However, the detailed descriptions of such elements are not necessary to an understanding of the invention, and accordingly, are not herein presented.

Simplified Illustrative Method And Apparatus For Producing A Welded Joint

One form of the method of the present invention is illustrated in FIGS. 1 and 2 wherein the apparatus is schematically represented and is designated generally by reference numeral 20. The apparatus 20 is intended for producing a welded joint between two overlapping portions of thermoplastic sheet or of a strap S having an upper strap portion 22 and a lower strap portion 24. The apparaus 20 can be used with a variety of suitable thermoplastic polymers, especially crystalline synthetic thermoplastic polymers such as polyamides, polyesters, polyolefins, and the like. However, certain of these polymers can provide preferred advantages as described in detail hereinafter.

The apparatus 20 includes two strap-engaging members, an upper, moveable strap-engaging member 26, and a lower, fixed strap-engaging member 28. Alternatively, the moveable member 26 may be located on the bottom and the fixed member 28 may be located on the top. Also, both members 26 and 28 may be moveable.

Upper member 26 is mounted to a drive rod 30 which is carried in a drive mechanism 32 for moving the rod 30, and hence the upper strap-engaging member 26, in a horizontal direction. Although a variety of motions may be used, in the illustrated embodiment, the motion is one of oscillation or reciprocation. The motion is generally transverse to the length of the strap S (in the directions indicated by the double-headed arrow 34).

The oscillator drive mechanism 32 is mounted to a rod 36 carried in an actuator mechanism 38 disposed at a fixed location. The actuator 38 is effective to move the oscillator drive mechanism 32 and the connected strap-engaging member 26 upwardly or downwardly in the directions indicated by the double-headed arrow 40.

The actuator 38 can be regarded as functioning as a closing means for effecting relative movement between the two strap-engaging members 26 and 28 for pressing the strap portions together. The same actuator 38 can also be regarded as an opening means for effecting relative movement between the members 26 and 28 to subsequently release the pressure on the strap portions. However, it is to be realized that, in an alternate embodiment (not illustrated), member 28 could also be moveable and that, if desired, a separate opening mechanism (e.g., actuator) could then be employed with the member 28 to move it away from the member 26 to release the pressure.

The actuator 38 may be of any suitable type, such as a hydraulic or pneumatic actuator, an electric motor, a cam device, or the like. Similarly, the oscillator drive mechanism 32 may include suitable conventional systems for effecting oscillation of the strap-engaging member 26. For example, an 1 and coupled eccentric drive system may be provided as part of the mechanism 32.

Preferably, the bottom surface of the strap-engaging member 26 is roughened or has teeth 42, and the upper surface of the strap-engaging member 28 is also roughened or has teeth 44. It is desired that the strap portions 22 and 24 be contacted by the strap-engaging members 26 and 28, respectively, so that relative oscillation movement of one or both of the strap-engaging members will cause the strap portions to be oscillated with the contacting strap-engaging members and relative to each other.

FIG. 2 illustrates the upper strap-engaging member 26 moved downwardly to press the overlapping strap portions into face-to-face contact under pressure at an interface region. The upper strap-engaging member 26 may be oscillating prior to, as well as during, contact with the upper strap portion 22. Alternatively, the member 26 may be oscillated only after forcing the upper strap portion 22 into contact with the lower strap portion 24.

In any case, relative bodily sliding movement is effected between the two strap portions 22 and 24 whereby at least part of the thickness of each strap portion melts at the interface region or weld generally designated by reference numeral 46. It is to be noted that the oscillator drive mechanism 32, operating with through the strap-engaging member 26, functions as a means for increasing the energy in the strap portions at the interface region sufficiently to melt at least part of the thickness of each strap portion.

According to a preferred embodiment of the method of the present invention, the energy in the strap portions is increased in such a manner so as to not only melt at least part of the thickness of each strap portion, but so as to also form a plurality of cavities 50 within the molten parts of the strap portion across the width of the interface regions. Subsequently, the step of increasing the energy in the strap portions (e.g., the step of effecting relative oscillation) is terminated, and the strap portions at the interface region subsequently solidify to encapsulate the cavities 50 and form the welded joint. As explained in detail hereinafter, such cavities 50 can result in the weld 46 having a greater strength.

According to another aspect of the invention, the welding pressure may be released while the strap portions are still molten—regardless of whether or not cavities are also formed. Although this early release of pressure is contrary to conventional practice and teachings, it has an advantage, in friction-fusion welding, that the cooling and solidifying portions will not be disturbed by the vibratory member as its vibration amplitude is damped to zero upon termination of the welding step.

In the preferred form of the invention illustrated in FIGS. 1 and 2, wherein the energy in the strap-portions is increased through the oscillation of a strap-engaging member 26, the oscillating strap-engaging member 26 is disengaged from the strap portion 22 to release the welding pressure while the strap portions are still molten. This has been found to result in the production of the desired cavities 50 under certain conditions.

FIGS. 3 and 4 illustrate an alternate embodiment of the apparatus of the present invention, and the alternate embodiment apparatus is designated generally by the reference numeral 20' in FIG. 3. The apparatus 20' includes two fixed members 49' for supporting the overlapping strap portions 22 and 24. The members 49' are spaced apart to accommodate the movement of a lower strap-engaging member 28' toward and away from the strap portions. The strap-engaging member 28' is moved upwardly or downwardly, in the directions indicated by the double-headed arrow 29', by a suitable mechanism, such as a conventional cam or pneumatic actuator 31'.

The apparatus 20' includes an upper guide block 25' for receiving an upper strap-engaging member 26'. The member 26' is slidably disposed within the guide block 25' and is operably reciprocated transversely of the strap length by a suitable eccentric drive mechanism 32'.

It is to be noted that the bottom surface of the upper strap-engaging member 26' is recessed somewhat above the downwardly facing end surfaces 33' of the guide block 25'. Thus, when the lower strap-engaging member 28' is in the downwardly retracted position away from the strap portions, the strap portions will extend across the guide block 25' out of contact with the upper strap-engaging member 26' owing to the influence of gravity, or inherent strap stiffness, or strap tension, if any.

When it is desired to weld the strap portions together, the lower strap-engaging member 28' is elevated as illustrated in FIG. 4 to press the strap portions against the recessed, upper strap-engaging member 26' which is reciprocated by the eccentric drive 32'. The welding pressure can then be immediately released, if desired, while the strap portions are still molten.

To this end, the lower strap-engaging member 28' is lowered, and the strap portions 22 and 24, under the influence of gravity, strap tension, and/or their inherent stiffness, move away from the recessed vibrating strap-engaging member 26'. Typically, if this method is effected on overlapping strap portions in a tensioned strap loop, the tension in the strap will aid in quickly pulling the overlapping strap portions away from the strap-engaging member 26' and into the substantially straight configuration illustrated in FIG. 3.

Employment Of The Method And Apparatus To Produce An Increased Strength Weld

The Structure Of The Increased Strength Weld

It has been found that the above-described, novel friction-fusion welding process can be employed to form the cavities 50 in nylon and polyester strap, and that an increased strength weld is obtained (for selected values of the other variables such as welding time, welding pressure, and the like). Such strap is commercially available in the U.S.A. at least in 6 mm., 11 mm., and 13 mm. widths with a maximum thickness of about 0.89 mm. and a minimum thickness ranging between about 0.34 mm. and 0.44 mm., depending on the type of strap.

With reference to FIG. 2, the cavities 50 are dispersed generally across the with of the strap weld 46 and are more generally concentrated toward each longitudinal end of the weld 46. In the preferred form of the weld, the concentration of cavities 50 in the weld middle portion (e.g., a central ⅓ length of the weld) is substantially less than at the weld ends (e.g., a ⅓ length of the weld at each end).

In one form of the method of the invention, the cavities 50 are believed to result from the production of gaseous bubbles during the welding process. It is believed that some types of strap contain significant amounts of an additional material, such as moisture, which can exist as a gas when the strap portions are melted under pressure. For example, polyester and polyamide nylon strap are hygroscopic and can contain some amount of water.

It is believed that when portions of such strap are melted and are under pressure during welding, the generated gas bubbles tend to be forced outwardly toward the edges and ends of the weld. If the welding pressure is terminated while the strap portions are still molten and before all of the bubbles have been squeezed out of the weld area, the remaining bubbles become encapsulated within the solidifying strap material to form the cavities 50.

The exact mechanism by which the cavities 50 are formed under certain conditions as described above are not necessarily fully understood, and there is no intent herein to be bound by any theory or by any explanation as provided above. The number of cavities 50, the size of cavities, and the distribution of cavities in a particular weld having improved strength according to this invention can vary. It is not possible or practical to give exact values for these characteristics for all welds produced by embodiments of the method and apparatus of this invention. However, typical preferred process parameters for producing such an improved weld are set forth hereinafter.

The Increased Weld Strength

According to one aspect of the present invention, when a weld is produced which contains the above-described cavities 50, the strength of the weld is greater than the strength of a weld that is produced in the same strap and that does not have the cavities 50. The strength of a weld between overlapping strap portions is conventionally determined by tensile loading of the welded strap portions and comparing the load at weld failure to the load required to rupture a virgin length of the strap per se. For example, the strength of welds in conventional commercial polyester strap typically ranges between about 35% and about 55% when such welds are made by conventional friction-fusion techniques in commercial strapping machines (e.g., the power strapping machine sold under the designation "MCD 700/300" by Signode Corporation, 3600 West Lake Avenue, Glenview, Ill., 60025, U.S.A.). In comparison, a polyester strap weld having cavities 50 produced as discussed above may have a joint strength of 60% to 80% or higher.

It is believed that the improved joint strength of the weld results from the redistribution of stresses within the weld, and that the cavities 50 cause the stress redistribution. More specifically, it is believed that welds fail when cracks form at the ends of the weld. The cavities are believed to reduce the stresses at a crack tip that is propagating into one or more of the cavities. It is believed that the most effective cavities in redistributing or reducing the stress are those that have a largest cross-sectional dimension of about 50% of the thickness of the weld. It is further believed that the substantially reduced concentration of cavities in the middle of the length of the weld produces lower nominal stresses in the weld and consequently reduces the local stress at the cavities that are concentrated at the ends of the weld.

The exact mechanism by which the cavities increase the weld strength is not necessarily fully or accurately understood, and there is no intent herein to be bound by any theory or by any explanation as provided above.

The Preferred Operational Parameters For Obtaining Improved Weld Strength

Insofar as parameters affecting the increased strength weld have been presently investigated by the inventors, it has been found that improved weld strength can be consistently produced under certain conditions with polyester strap, especially that polyester strap sold in the U.S.A. by the aforementioned Signode Corporation under the commercial product designation "Tenax B" strap. This is a polyethelene terephthalate composition having an intrinsic viscosity of about 0.95. Improved welds have also been produced in polyethelene terephthalate strap which has an intrinsic viscosity of about 0.62 and which is sold by Signode Corporation under the product designation "Tenax A" strap. These materials have the capability of being provided with varying degrees of uniaxial orientation sufficient to provide the strengths desired for a variety of specific conventional strapping applications.

The improved weld strengths have been obtained with such strap in the commercially available sizes identified hereinbefore. The improved welds were made using a presently preferred process for initially increasing the strap energy, and that preferred process is friction-fusion welding. The improved welds were made with weld lengths of about 16 mm. and about 19 mm., but it is believed that the weld length per se is not critical. The minimum length of the weld for a desired weld strength would depend upon, inter alia, the strap width as well as the selected combination of the other weld process parameters discussed hereinafter.

The friction-fusion process for producing the improved strength welds includes vibrating one of the overlapping strap portions (transversely of its length in the preferred embodiment), preferably at a frequency between about 300 hertz and about 500 hertz under a preferred welding pressure between about 5.0 megapascals and about 12.6 megapascals. The welding interval is preferably between about 100 milliseconds and about 800 milliseconds. The vibration amplitude is preferably between about 0.8 mm. and about 2 mm. An amplitude of about 1.6 mm. with a welding interval of about 150–200 milliseconds has been found to work well in a prototype for a proposed commercial welding machine described in detail hereinafter.

The weld pressure is released at the end of the welding interval while the strap portions are molten. The weld is permitted to cool in air at standard or normal temperature and pressure, preferably for a time interval of at least about 50 or 60 milliseconds before any significant tension load is applied to the welded strap.

As discussed above, the cavities (which are believed to contribute to increased joint strength) are thought to result from material in the strap, such as moisture, that forms gaseous bubbles in the molten weld region. It has been proposed to add such material to the weld region environment before or during welding.

It has also been proposed to add such bubble-producing material directly to the surface of strap that does not normally contain such material. For example, conventional polypropylene strap does not hold moisture in amounts sufficient to form bubbles when the strap is welded in accordance with the present invention. However, a layer of a bubble-forming material could be coextruded on each surface of polypropylene strap. Such a layer could be a polyester strap material that normally contains amounts of moisture believed to be sufficient to generate the bubbles during the welding process.

To the extent that the weld cavities 50 (FIG. 2) may result completely, or partly, from moisture adsorbed or absorbed by the strap, the relative humidity of the atmosphere surrounding the strap during the welding process is presently believed to have some effect. To the extent revealed by present investigations, the most improved weld strengths are more consistently achieved with such strap in an atmosphere where the relative humidity is about 60%.

Preferred Embodiment Of The Apparatus

The Preferred Apparatus Components In An Automatic Strapping Machine

It has been proposed to develop a commercial form of the apparatus of the present invention in an automatic strapping machine. A preferred form of the apparatus of the invention in such a machine is next described.

Referring now to the drawings, an automatic strapping machine 52 is shown in its entirety in FIG. 5. Strap S is fed to the machine 52 from a dispenser 53 through an accumulator 54. The dispenser 53 and accumulator 54 may be of a suitable special or conventional design.

The strap S is fed through a lower housing 55 of the machine 52 and around a chute 56 on top of the housing 55. The housing 55 defines an object receiving station in which is placed the object (not shown in FIG. 5) that is to be bound with the strap S. The chute 56 may be of a special design or may be of a suitable conventional design.

In the lower housing 55 of the machine 52 there are appropriate strap feeding and tensioning mechanisms (not illustrated). Such mechanisms first feed the strap S into the chute 56 to form the loop and then subsequently tension the strap S tight about the object. The feeding and tensioning assembly may be of a special design or may be of a suitable conventional design.

Suitable designs for a dispenser 53, accumulator 54, chute 56, and feeding and tensioning assembly are employed in the power strapping machine sold in the U.S.A. under the designation SPIRIT ™ Strapping Machine by Signode Corporation, 3600 West Lake Avenue, Glenview, Ill. 60025, U.S.A. and are described in the "OPERATION, PARTS AND SAFETY MANUAL" for the machine as published by Signode Corporation under the designation "286022" and dated "8/85." The specific details of the dispenser, accumulator, chute, and feeding and tensioning assembly form no part of the present invention.

The strap gripping and sealing assembly of the present invention for use in the strapping machine 52 is located in the machine lower housing 55 below the chute 56 and generally in the region identified by the dashed line circle 57 in FIG. 5. The assembly includes various anvil, gripper, platen, cutter, and vibrator weld plate components, and such components are described in detail hereinafter.

The components comprising the strap gripping and sealing assembly for the machine 52 are illustrated in more detail in FIGS. 6–12. At the horizontal top surface of the housing 55, as best illustrated FIGS. 6–8, the strap chute 56 has appropriate strap receiving sections 60 which each define a slot or channel 62 for receiving the strap S. Any suitable strap receiving section structure may be provided, such as that incorporated in the above-discussed SPIRIT ™ Strapping Machine marketed in the U.S.A. by Signode Corporation and described in the above-identified "OPERATION, PARTS AND SAFETY MANUAL" for that machine. However, for purposes of describing the present invention, there is illustrated in FIGS. 6 et seq. a specific embodiment of the strap receiving section 60 that has a generally sideways oriented, U-shaped configuration.

The opening of channel 62 in each section 60 is normally blocked by retaining members 64. These retain the strap S in the channel 62 when the section 60 is in the position illustrated in solid line in FIG. 7.

Each strap receiving section 60 is movable in the direction of the arrow 66 to a retracted position illustrated by the broken lines in FIG. 7. In the retracted position, the section 60 is spaced from the retaining member 64, and the strap S is free to be pulled out of the slot 62 against the object being bound.

The means for moving the strap receiving sections 60 between the two positions illustrated in FIG. 7 may be of any suitable conventional design (e.g., electric solenoid operators, hydraulic operators, or other mechanical drive mechanisms), the details of which form no part of the present invention.

To provide a convenient support surface for an object being bound, the machine lower housing 55 preferably includes generally horizontally disposed package or object support plates 74 and 75 which each define an upper horizontal surface adjacent the sections 60.

An anvil 70 is provided between two spaced-apart strap receiving sections 60 as illustrated in FIGS. 5 and 8. The anvil 70 is also moveable, in the direction indicated by the arrow 72 in FIG. 6, from an extended position over the path of the strap S to a retracted position (shown in broken lines in FIG. 10) which will permit the strap S, after the strap loop has been tensioned and welded, to snap upwardly tight against the bottom of the object being bound.

Figure 11:
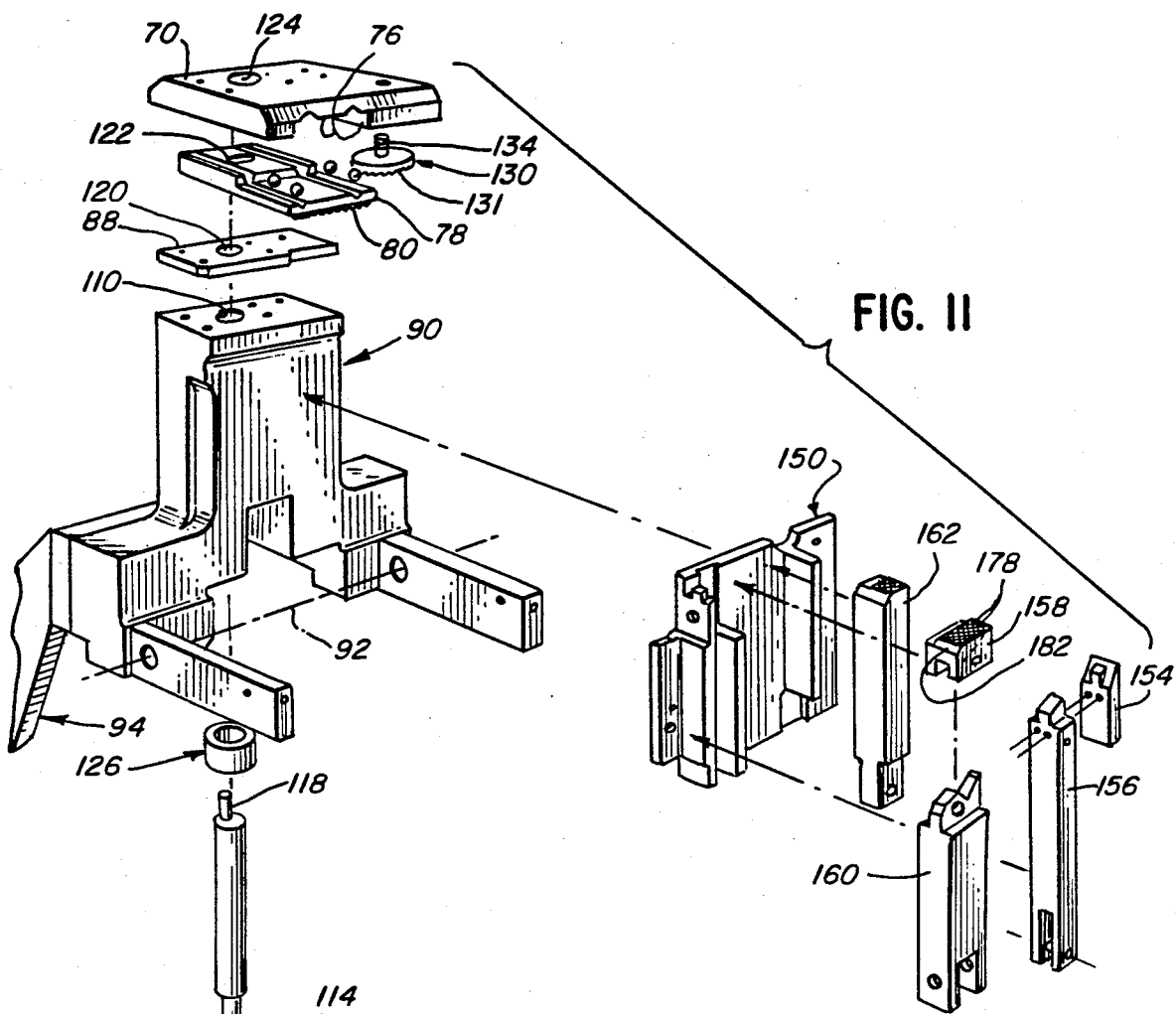
FIG. 11 is an exploded, perspective view of the gripping and sealing assembly components illustrated in FIG. 9.

As best illustrated in FIGS. 8 and 11, the anvil 70 defines a recess 76 in which is received a vibrator pad or weld plate 78 having downwardly projecting teeth 80. The weld plate 78 functions as a strap-engaging member for engaging the upper overlapping strap portion 22 and for effecting oscillation of the strap portion 22. In the preferred embodiment, each tooth projects downwardly about 0.35 mm. The base of each tooth, in plan, defines a rhombus in which two of the interior vertex angles are each about 60° and in which two of the interior vertex angles are each about 120°. The four exterior sides of each tooth converge inwardly to a point and are incined at an angle of about 60° to the surface of the weld plate containing the teeth 80. The teeth 80 are preferably arranged in a uniform array with a tip-to-tip spacing of between about 1 mm. and about 2 mm.

The weld plate 78 is mounted for reciprocation relative to the anvil 70 in the direction generally indicated in FIG. 10 by the double-headed arrow 84. To this end, a ball bearing and retainer assembly 86 is interposed between the top of the weld plate 78 and the downwardly facing upper surface of the anvil recess 76.

Part of the bottom of the weld plate 78 rests on a plate 88. The downwardly facing surfaces of the anvil 70 on either side of the anvil recess 76 also rest upon the plate 88. The plate 88 is disposed on top of a frame 90. The frame 90 is pivotally mounted about an axis 92 to a suitable support structure (not illustrated) in the machine 52. The frame 90 is adapted to pivot about the axis 92 between the extended position illustrated in solid line in FIG. 10 and the retracted position illustrated in broken lines in FIG. 10.

A motor mount 94 is attached to the frame 90 for supporting an electric motor 96. A rod 98 is attached to the lower end of the motor mount 94 for being engaged by a suitable mechanism (not illustrated) for pivoting the assembly of the motor mount 94 and frame 90 to the retracted position illustrated in broken lines in FIG. 10. Such a mechanism may include a conventional cam apparatus (not illustrated), and the assembly may be continuously biased to the extended position (illustrated in solid lines in FIG. 10) by a suitable spring (not illustrated). The detailed design and specific structure of such a cam and spring arrangement, or of any other system for effecting pivoting movement of the frame 90, form no part of the present invention.

Figure 12:
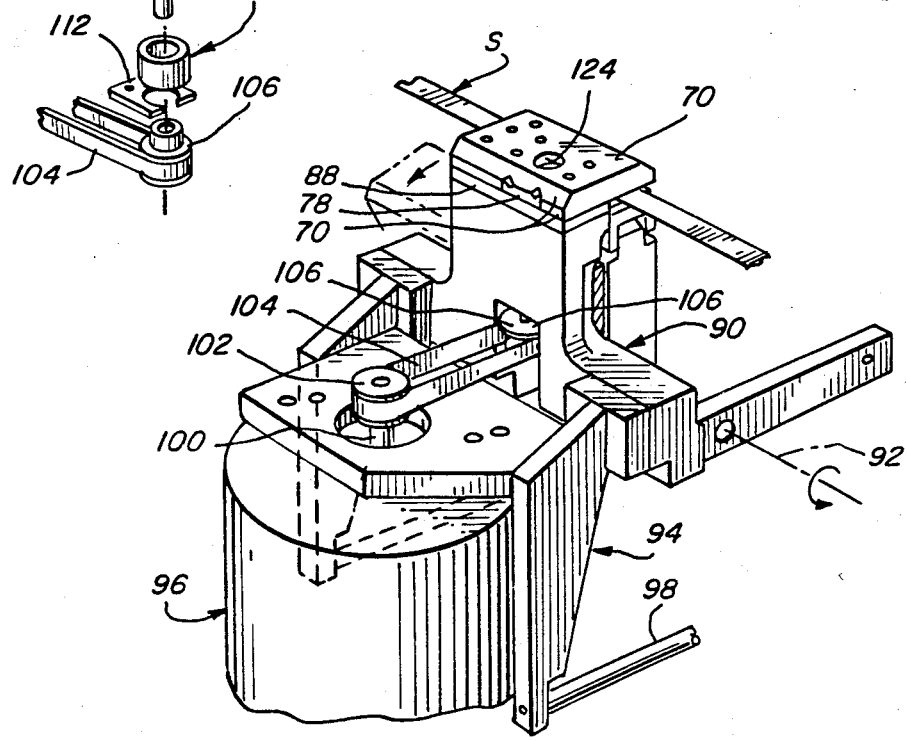
FIG. 12 is a perspective view of the gripping and sealing assembly components illustrated in FIGS. 9 and 11, but viewed from inside the machine looking toward the rear.

The weld plate 78 is vibrated by the motor 96. To this end, the motor 96 includes a shaft 100 on which is mounted a pulley 102 as illustrated in FIGS. 10 and 12. A drive belt 104 is trained around the pulley 102 and around another pulley 106 which is mounted to the lower end of an eccentric shaft 108. The eccentric shaft 108 is disposed within a cavity 110 that extends vertically through the frame 90. At the bottom of the frame 90, a bearing retainer 112 is mounted in the frame 90 and retains a bearing 114 around the lower end of the shaft 108.

The upper end of the shaft 108 is journaled within a needle bearing assembly 116 and has an upwardly projecting shaft portion 118 which has a laterally offset longitudinal axis. In the preferred embodiment, the eccentric offset is about 0.8 mm.

The upper shaft portion 118 extends through an aperture 120 in the plate 88, through an elongate aperture 122 in the weld plate 78, and through an aperture 124 in the anvil 70. The aperture 120 in the plate 88 and the aperture 124 in the anvil 70 are each large enough to accommodate the revolution of the eccentric shaft portion 118 without interference.

The upper shaft portion 118 is journaled within a needle bearing assembly 126 in the elongate aperture 122 of the weld plate 78. The bearing assembly 126 engages the opposite sides of the weld plate aperture 122 as illustrated in FIG. 10, but the diameter of the bearing assembly 126 is less than the length of the aperture 122 (as measured along the length of the aperture 122 perpendicular to the plane of the FIG. 10). Thus, rotation of the eccentric shaft 108 by the electric motor 96 effects reciprocation of the weld plate 78 in the directions of the double-headed arrow 84.

As best illustrated in FIGS. 8 and 11, the anvil 70 also carries a rotatable gripper pad 130. The pad 130 has an enlarged lower cylindrical portion 131 with downwardly directed teeth 132. The teeth 132 are similar to the teeth 80 on the weld plate 78 except that each tooth 132 has a square base to provide a pyramid tooth shape. The faces of each tooth converge to a tip at about a 45° angle relative to the surface of the gripper 130 which contains the teeth 132.

Preferably, the outer edge of the enlarged lower cylindrical portion 131 of the gripper 130 is chamfered inwardly at about a 60 degree included angle relative to the surface. This aids the passage of the strap leading end past the gripper 130 during strap feeding.

The rotatable gripper 130 has an upwardly extending cylindrical portion 134 which is reduced in diameter and which is received in a bore 136 in the anvil 70 (FIG. 8). The cylindrical portion 134 defines an annular groove 138 for receiving an O-ring or snap ring 140 which is accomodated in an enlarged diameter bore 142 in the anvil 70. This assembly retains the rotatable gripper 130 in the anvil 70 but permits the gripper 130 to rotate (typically a few degrees in either direction) under the influence of the strap S as the strap contacts the gripper 130 during the strap welding operation which is described in more detail hereinafter.

A plurality of other strap contacting components are provided below the anvil 70 for cooperating with the anvil 70 to effect specific operations on the strap S. These components are best illustrated in FIGS. 8–11.

Specifically, with reference to FIG. 11, a guide plate 150 is mounted to the frame 90 and defines receiving regions or guideways for a cutter knife or blade 154, a cutter blade link 156, a strap-engaging block or platen 158, a platen link 160, and a loop gripper 162.

As best illustrated in FIGS. 8 and 11, the cutter blade 154 is attached to the cutter link 156 by means of two pins 166. The cutter blade 154 is adapted to slide against the side of the platen 158 and may, if desired, slide against the side of the platen link 160.

The platen 158 is pivotally mounted to the link 160 by means of a pin 170 (FIG. 8). The platen 158 is thus pivotable about an axis of rotation which is generally normal to the plane of the strap loop that is formed in the machine.

As best illustrated in FIGS. 9 and 11, the platen 158 has a generally inverted U-shaped configuration and is mounted to the link 160 so that the platen 158 and link 160 cooperate to define a passageway 174 in a strap length receiving region below the upper portion of the platen 158.

The upper surface of the platen 158 preferably includes a plurality of teeth 178 for gripping the strap. The teeth 178 preferably have substantially the same shape and configuration as the the teeth 80 on the overlying weld plate 78. However, the height of each platen tooth 178 in the proposed commerical embodiment is about 0.2 mm.—somewhat less than the height of the weld plate teeth 80.

In the proposed commerical embodiment illustrated, the length of the toothed face of the platen 158 which contacts the strap is about 19 mm. Preferably, the length of this toothed strap-engaging surface is less than the length of the weld plate 78 (as measured parallel to the length of strap below the anvil 70).

The weld plate 78 is disposed within the anvil recess 76 so that the downwardly projecting surfaces of the anvil 70 on either end of the weld plate 78 project below the tips of the teeth 80 on the weld plate 78. The weld plate 78 is recessed by an amount sufficient to prevent contact between the strap and the weld plate teeth 80 when the strap is pulled tight across the bottom of the anvil 70 but is not otherwise pressed against the weld plate 78 by the platen 158. The desirability of this relationship is described hereinafter with reference to operation of the machine.

The platen 158 also preferably has a chamfered corner 182 (FIG. 8). This serves to provide a considerably reduced pressure at the severed end of the strap during the welding step. It has been found that, under some operating conditions and with some types of strap, this chamfered structure results in a somewhat improved quality weld. Specifically, with polyester and polyamide nylon strap, it is believed that such a platen configuration results in improved bubble or cavity formation at the end of the weld adjacent to the chamfer 182.

The loop gripper 162 is slidably disposed in the plate 150 adjacent the platen 158. The loop gripper 162 also has an upwardly facing surface with teeth 186 below the rotatable gripper 130. The loop gripper teeth 186 may have substantially the same shape and spacing as the platen teeth 178 except that the loop gripper teeth 186 preferably have a greater height, about 0.35 mm.

The cutter blade 154 (and connected cutter link 156), the platen link 160, and the loop gripper 162 are moved upwardly and downwardly independently of each other by appropriate mechanisms (not illustrated). These mechanisms may be of any suitable conventional or special design. In the proposed commercial form of the machine embodying the apparatus of the invention, it is contemplated that such motion will be effected with a rotating cam set (not illustrated) and with appropriate cooperating springs (not illustrated) to bias the cutter link 156, the platen link 160, and the loop gripper 162 against the cam set.

To this end, cam follower roller devices (not illustrated) may be mounted to the bottom of the cutter link 156, the platen link 160, and the loop gripper 162 for engaging the cam set. In addition, the platen link 160 may be provided with a suitable multiple spring and lever arm device for enabling the cam set to elevate the platen 158 against the weld plate 78 with a first force during one period in the strapping cycle and to elevate the platen 158 against the weld plate 78 with a second, reduced force at another point in the strapping cycle. Such spring mechanisms, along with the cam set mechanism, are well known to those of ordinary skill in the art. For example, such mechanisms are disclosed in the above-identified "OPERATION, PARTS AND SAFETY MANUAL" for the Signode SPIRIT TM Strapping Machine. Such specific mechanisms, and the detailed designs therefor, form no part of the present invention.

With reference to FIGS. 8 and 9, the strap S is initially fed into the machine 52 over the cutter blade 154. To this end, a moveable strap guide channel 202 is provided adjacent the cutter blade 154 (FIG. 8). The channel 202 is pivotally mounted to the machine about a pin 204. A pin 206 projects from the machine below the channel 202 and prevents the channel 202 from pivoting downwardly beyond the position illustrated in FIG. 8. The channel 202 is normally biased downwardly against the pin 206 by a spring 207. The spring 207 is attached to the machine at one end by means of a pin 208 and is attached at the other end to a pin 209 projecting from the channel 202.

The strap S is initially fed into the end of the channel 202 along a fixed guide 210 (FIG. 8). The bottom of the channel 202 is open adjacent the end of the fixed guide 210 for accomodating a wheel 212 which is mounted to the machine for rotation about an axis 214. The wheel 212 can rotate in response to the movement of the strap into the channel 202, and this reduces the friction drag force on the strap as it is fed through the channel 202.

As best illustrated in FIG. 8, the anvil 70 includes a downwardly angled wall 146 at one end of the anvil 70 adjacent the rotable gripper 130. The wall 146 aids in deflecting the leading edge of the strap S downwardly and into the adjacent strap receiving channel 62 when the strap is first fed below the anvil 70 and into the strap receiving section 60 of the chute 56. Subsequently, after the strap has traveled around the chute 56, and after the leading end of the strap has again passed under the anvil 70 on top of the lower strap portion, the anvil wall 146 functions to prevent further forward movement of the strap leading end (FIG. 13).

The Operation Of The Apparatus Components In The Automatic Strapping Machine The operation of the above-described preferred embodiment of the apparatus in the automatic strapping machine is next described. It has been proposed to operate many of the machine mechanisms through a rotating set of cams (briefly discussed above) controlled by a microprocessor (not illustrated). Actuation, in an automatic strapping machine, of various strap-engaging instrumentalities, such as an anvil, cutter knife, loop gripper, platen, etc., by means of rotating cams is a known, commercial design approach. See, for example, the cam actuator system design for the above-discussed SPIRIT TM Strapping Machine which is sold in the U.S.A. by Signode Corporation and which is described in the above-identified document entitled "OPERATION, PARTS AND SAFETY MANUAL" for the SPIRIT TM Strapping Machine. That document is incorporated herein by reference thereto to the extent pertinent and to the extent not inconsistent with the present disclosure.

The detailed design of the cam set mechanism and related control system for operating the proposed commercial form of the machine in accordance with the present invention forms no part of the present invention. Other mechanisms could be used (e.g., electric solenoid actuators, hydraulic or pneumatic actuators, individual electric motors, etc.). However, for completeness, the operation of the apparatus of the present invention is set forth hereinafter with reference to a cam set mechanism and related control system, including a drive system, switches, and a microprocessor. The mechanism is briefly described, but without reference to detailed illustrations of conventional design approaches which are well-known to those of ordinary skill in the art.

In the proposed commercial form of the machine incorporating the apparatus of the present invention, a plurality of adjacent cams are mounted to a cam shaft to form the cam set (hereinafter designated as a "cam" for simplicity). The cam shaft is rotated through a wrap spring clutch or roller ramp clutch as controlled by a microprocessor, and this clutch is driven from a continuously rotating jack shaft from a main motor.

The mounting frame 90 for the anvil 70 is normally spring-biased against the cam to position the anvil 70 over the strap path at the extended location (solid lines in FIG. 10). The anvil 70 is moved to the retracted position by the cam acting against the force of the anvil spring.

The platen link 160 and cutter blade link 156 are normally spring-biased away from the anvil 70 and against the cam. They are raised toward the anvil 70 by the cam against the force of the springs.

The loop gripper 162 is normally spring-biased against the anvil 70 and is adapted to be lowered by the cam acting against the force of the loop gripper spring.

The cam may also be employed to actuate one or more switches for initiating or terminating some machine operations (e.g., deenergizing the strap feeding and tensioning mechanism).

The microprocessor and clutch for driving the cam can function in a conventional manner. In general, the following operation is typical. The cam shaft is designed to complete one full rotation once during each strapping cycle, but is sequentially stopped during each strapping cycle at selected points corresponding to increments of less than a complete rotation. To this end, the cam shaft on which the cam is mounted carries a plurality of target lugs which are circumferentially spaced apart around the cam shaft (for example at 60° increments or other increments) and which rotate with the cam shaft. One or more proximity sensing switches are disposed at fixed locations adjacent the cam shaft to sense the presence of the target lugs as they rotate past the proximity switches during cam shaft rotation. Each proximity switch sends a signal to the microprocessor when a target lug is adjacent the switch but does not send a signal when there is no target lug adjacent the switch. The signals from one of the proximity switches may be used by the microprocessor in counting the number of target lugs that have rotated part the switch so as to identify the rotational position of the cam shaft during each strapping cycle.

The cam shaft is connected to the driven part of the clutch. The driven part of the clutch includes outwardly directed, circumferentially spaced teeth for being engaged by a pawl. The teeth may be spaced apart, for example, at increments that would correspond to the selected rotation increments of the cam shaft. The pawl is normally spring-biased against the clutch driven part so as to engage a tooth at every selected increment of cam shaft rotation for preventing rotation of the clutch driven part, and hence, of the cam shaft and cam. The driving part of the clutch slips when the driven part of the clutch is prevented from rotating by the engaged pawl. The pawl can be disengaged from a tooth of the clutch driven part by means of an electric solenoid which is energized in response to a signal from the microprocessor.

Some or all of the incremental rotation stops of the cam shaft may each be maintained for a time interval that is pre-programmed into the timer system of the microprocessor. This "stationary" cam time interval can be maintained when a tooth on the clutch driven part is engaged by the spring-biased pawl to terminate rotation of the clutch driven part (and of connected cam shaft) and one of the cam shaft target lugs is adjacent one of the proximity switches. This causes a signal to be sent by the switch to the microprocessor. This signals the microprocessor timer circuit to begin the timing of the programmed interval during which the cam shaft is stationary. After the timer system has timed the end of the interval, the microprocessor energizes the cam clutch electric solenoid to move the pawl so as to disengage the tooth on the clutch driven part and permit the clutch driven part to again be rotated by the continuously rotating clutch driving part.

As soon as the cam shaft starts rotating, the rotation of the cam shaft target lug away from the proximity switch causes the proximity switch signal to terminate. In response to that signal termination, the microprocessor deenergizes the clutch electric solenoid which releases the spring-biased pawl so that it can engage the next tooth on the clutch driven part at the end of the next increment of rotation of the cam shaft.

If desired, any of the target lugs may have an increased width to extend around part of the cam shaft circumference by an amount sufficient to maintain the proximity switch signal until two (or more) teeth on the clutch driven part rotate past the disengaged pawl. In such a case, the cam shaft would rotate until the wider lug cleared the proximity switch and the pawl was then released by the deenergized solenoid to engage the third tooth (or a subsequent tooth).

At the beginning of a new cycle, the strap is already in place in the chute to form a loop as shown in FIG. 13, and the upper overlapping strap portion 22 is gripped by the raised platen 158. The leading end of the strap S has stopped against the slanted wall 146 of the anvil 70.

With reference to FIG. 13, consider next the position of the strap S in the machine. Beginning with the strap leading end against the wall 146, it is to be noted that the strap extends clockwise under the rotatable gripper 130, between the weld plate 78 and elevated platen 158, through the strap chute receiving sections 60, around the chute 56, back under the anvil 70 below the upper overlapping portion of the strap, through the strap receiving passage 174 defined between the platen 158 and platen link 160, over the cutter blade 154, and into the guide 202.

The upper overlapping strap portion 22 below the anvil 70 is gripped against the weld plate 78 by the platen 158 which had been raised when the cam was rotated through the last increment in the previous cycle. At the end of the last cycle, the pawl had engaged the cam clutch driven part to prevent further rotation of the cam shaft. The microprocessor is programmed not to effect disengagement of the pawl until the strap loop has been tensioned in the next strapping cycle which is initiated by the operator.

The next strapping cycle is initiated by the machine operator actuating a foot switch 220 (FIG. 5). The foot switch 220 actuates the strap loop tensioning mechanism (not illustrated) in the above-discussed tensioning and feeding assembly (not illustrated). The detailed design and specific structure of such a tensioning mechanism incorporated in the machine 52 described herein form no part of the present invention.

The object to be bound has been omitted from FIGS. 13-20 for ease of illustration. However, the bound object, designated by reference numeral P in FIG. 21, is shown in FIG. 21 with the completed strap loop in place around the object.

The strap loop is tensioned around the object by pulling the strap trailing portion in a direction opposite from the strap feeding direction. This tension pulling direction is indicated in FIG. 14 by the arrowheads on the strap S. As the loop is tensioned, the strap receiving sections 60 are retracted (as illustrated in FIG. 7) to release the strap S which is pulled tight around the exterior of the object being bound.

Typically, a strap tensioning system includes means for sensing the tension force in the strap loop and for terminating the tensioning process when the desired tension level has been released. A signal is typically provided by such a tension sensing device, and the signal may be processed by the microprocessor in the machine 52 to automatically initiate the next step in the cycle. Specifically, in response to such a signal, the microprocessor energizes the cam clutch solenoid to disengage the clutch pawl and permit rotation of the cam through only a first increment of the full rotation. As the cam turns, it permits a spring (not illustrated) to raise the loop gripper 162 for gripping the two overlapping straps together between the loop gripper 162 and the anvil gripper 130 as illustrated in FIG. 15. The loop gripper spring (not illustrated) provides a suitable clamping force (e.g., about 220-320 kilograms of perpendicular clamping force where the loop has been tensioned to about 180 kilograms of tension force).

Next, the strap loop tensioning mechanism is deenergized by a switch actuated by the cam as it continues its rotation. This releases the tension in the trailing portion of the strap to avoid splitting the strap end during subsequent severing of the trailing portion of the strap from the tensioned loop. After the trailing strap portion tension has been released, continued rotation of the cam raises the cutter link 156 and cutter blade 154 to sever the trailing portion of the strap as illustrated in FIG. 16.

When the cutter link 156 and blade 154 are elevated to sever the strap, the top of the cutter link 156 forces the trailing portion of the strap against the upper wall of the pivotable strap guide 202. This forces the strap guide 202 to pivot upwardly against the bottom of the strap receiving section 60. The trailing portion of the strap is pinched by the cutter link 156 against the strap guide 202 as the strap is severed. This prevents the leading end of the severed strap trailing portion from sliding downwardly in the strap guide 202 away from the platen 158.

Next, as illustrated in FIG. 17, continued rotation of cam causes the platen 158 to be lowered following the strap severance (but the rotating cam continues to hold the knife 154 in the raised position). When platen 158 has reached its lowermost position, it is to be noted that the lower overlapping strap portion 24 has pulled out of the passageway 174 and is then on top of the toothed gripper portion of the platen 158.

As soon as the platen 158 lowers away from the strap as described above, the vibrator weld motor 96 (FIG. 10) is started. The vibrator motor 96 starts in response to a switch actuated by the cam. The rotation of the cam is then terminated at the completion of the first increment of rotation by the spring-biased pawl engaging a tooth on the clutch driven part (with the consequent slipping of the clutch drive part). This occurs as the platen 158 approaches its lowermost position. Meanwhile, the energized vibrator motor 96 is approaching its rated speed of rotation.

The vibrator motor 96 requires a predetermined "start-up" period to achieve the desired rotational speed for forming the welded joint. The timing of the vibrator motor start-up interval is initiated by a proximity switch signal in response to a cam shaft target lug stopping adjacent the proximity switch upon termination of the first rotation increment of the cam shaft. After the cam rotation is terminated, the cam remains stationary until the end of the vibrator motor start-up interval.

At the end of the vibrator motor start-up interval, the microprocessor energizes the cam clutch solenoid to disengage the pawl and permit continued rotation of the cam. The rotating cam elevates the platen 158 to push the two strap portions together against the vibrating weld plate 78 (FIG. 18). The cam acts on an arm and spring assembly (not illustrated) that is associated with the platen 158 to raise the platen 158 against the overlapping strap portions and overlying weld plate 78 with the desired force of between about 5.2 megapascals and about 6.9 megapascals.

Note that the weld plate 78 is oscillating as the strap portions are pushed into engagement therewith. The cam rotation stops at the next increment position when the pawl again engages another tooth on the cam clutch driven part. At this point, the timer in the microprocessor keeps the cam stationary by not energizing the pawl solenoid for a time period sufficient to maintain the platen 158 in the elevated position (FIG. 18) while the interface region of the overlapping straps becomes molten. The desired weld time interval for this proposed commercial form of the machine is between about 100 and about 200 milliseconds. The oscillating weld plate 78 vibrates the upper strap portion transversely of its length while the loop gripper 162 and rotatable gripper 130 continue to clamp the overlapping strap portions together adjacent the weld plate 78. The transverse movement of the upper strap portion is accommodated by the rotatable gripper 130 which can oscillate about its vertical axis with the upper strap portion.

After the predetermined weld time interval has elapsed, the microprocessor energizes the clutch solenoid to effect disengagement of the cam clutch pawl again so as to permit rotation of the cam through another increment. This further increment of cam rotation lowers the cutter blade 154 and lowers the platen 158 away from the vibrating weld plate 78 to the "feed" position as illustrated in FIG. 19. The overlapping strap portions in the loop are still gripped between the elevated loop gripper 162 and anvil gripper 130. Since the loop is under tension, the tensioned, upper overlapping strap portion 22 is pulled away from the recessed, vibrating plate 78 so that the strap portion 22, and the adjacent lower strap portion 24, extend generally straight across the bottom of the anvil 70.

As soon as the platen 158 starts to be lowered away from the vibrating weld plate 78 to release the pressure on the strap, the cam actuates a switch to turn off the vibrator motor 96. Meanwhile, the cam continues rotating toward the next incremental stop position while the strap portions undergo an unpressurized cooling or "cool-down" interval.

For the proposed form of the commercial machine, the unpressurized cooling interval is in a range between about 50 milliseconds and about 60 milliseconds for polyester strap of the commercial sizes earlier described. Surface tension and the inherent stiffness of the short length of each strap portion prevent the lower strap portion 24 from separating from the upper strap portion 22 before the weld solidifies. During the unpressurized cooling interval, the loop gripper 162 still holds the strap portions together against the rotatable gripper 130. Thus, the loop tension cannot act on the lower strap portion 24 at the weld. Thus, there is substantially no tension force tending to pull the strap portions 22 and 24 apart at the weld.

During the cool-down interval, the cam continues to rotate and eventually causes the loop gripper 162 to be lowered as illustrated in FIG. 20 at the end of the cool-down interval. This releases the adjacent, unwelded overlapping strap portions. Simultaneously with the initiation of the loop gripper lowering, the anvil 70 is retracted by the cam so as to be pulled out of the tensioned loop for permitting the loop to snap up against the bound object P as illustrated in FIG. 21.

The cam rotation is terminated at the next incremental stop position by the clutch pawl when the anvil 70 reaches the point of maximum retraction. The microprocessor timer system maintains this stationary interval for a predetermined length of time that is just sufficiently long to ensure that the welded strap loop has snapped against the bottom of the object and to ensure that the vibration amplitude of the weld plate 78 has been damped to zero.

After this interval, the microprocessor effects momentary disengagement of the cam clutch pawl to again permit the cam to undergo another increment of rotation. This further rotation of the cam drives the anvil 70 back over the strap path. After the anvil 70 is returned to the extended position over the strap path, the clutch pawl stops the cam rotation at the end of the increment of rotation. At that point, the microprocessor initiates feeding of the strap for forming a new loop in the chute 56 (FIG. 5). This is effected by energizing a suitable strap feeding mechanism (not illustrated) in the strap feeding and tensioning assembly (not illustrated). The detailed design and specific structure of such a strap feeding mechanism incorporated in the machine 52 described herein form no part of the present invention.

As the strap is fed into the chute 56, the leading end of the strap hits a conventional chute switch (not illustrated) on the upstream side of the anvil 70. That switch initiates a timer system in the microprocessor which is programmed to continue the strap feeding for a time interval sufficient to permit the strap to continue past the switch, to pass under the anvil 70 on top of the lower strap portion 24, and to finally hit the anvil slanted wall 146. At the end of the time interval, the microprocessor signals the strap feeding mechanism to terminate the strap feeding.

The above-described chute switch signal, in addition to initiating the microprocessor timer interval for accommodating feeding of the strap against the anvil slanted wall 146, is also processed by the microprocessor to initiate another, final incremental rotation of the cam. This rotation of the cam raises the platen 158 for gripping the end of the upper strap portion 22 against the overlying weld plate 78. Preferably, the cam acts through the arm and spring assembly (not illustrated) that is associated with the platen 158 so as to raise the platen 158 to push the upper strap portion 22 against the overlying weld plate 78 with a pressure of between about 10.4 megapascals and about 13.8 megapascals. The machine 52 is then ready to begin the next strapping cycle which can be intitiated by the operator stepping on the foot switch 220 (FIG. 5).

It will be readily observed from the foregoing detailed description of the invention and from the illustrated embodiments thereof that numerous variations and modifications may be effected without departing from the true spirit and scope of the novel concepts or principles of this invention.

What is claimed is:

1. Apparatus for producing a welded joint between two overlapping portions of thermoplastic strap, said apparatus comprising:

two strap-engaging members between which said strap portions can be positioned;

closing means for effecting relative movement between said two strap-engaging members to engage said strap portions and force said strap portions into face-to-face contact under pressure at an interface region;

member moving means for moving one of said strap-engaging members while in contact with one of said strap portions to effect relative bodily sliding movement between said strap portions whereby at least part of the thickness of each strap portion melts at said interface region; and opening means for effecting relative movement between said two strap-engaging members to release said pressure on said strap portions and to effect disengagement between at least said one strap-engaging member and said one strap portion while said parts of said strap portions are molten whereby said strap portions at said interface region subsequently solidify in the absence of pressure from said strap-engaging members to form said welded joint.

2. The apparatus in accordance with claim 1 in which said closing means and said opening means include an actuator that is associated with said other strap-engaging member and that functions as both said closing and opening means to move said other strap-engaging member alternately toward and away from said one strap-engaging member.

3. The apparatus in accordance with claim 2 in which said apparatus is adapted for use in a strapping machine of the type that has (1) means for feeding a length of said thermoplastic strap around an object to form a loop wherein said one strap portion is an upper strap portion and said other strap portion is a lower strap portion and wherein a trailing portion of the strap extends from said lower strap portion and (2) means for pulling said strap trailing portion to tension said strap loop about said object;

in which said apparatus further includes:

(a) an anvil on said machine adjacent a path in which said upper and lower strap portions can be positioned in overlapping relationship, said one strap-engaging member being carried by said anvil and mounted therein for oscillation relative thereto;

(b) a loop gripper means on said machine for being moved (1) away from said anvil to accommodate the feeding of said upper and lower strap portions above said loop gripper means and (2) toward said anvil to grip said lower and upper strap portions between said anvil and said loop gripper means after said loop has been tensioned; and (c) a movable cutter means on said machine for severing said strap trailing portion from said lower strap portion after said loop has been tensioned; and in which said other strap-engaging member is disposed between said loop gripper means and said cutter means for being moved by said actuator sequentially (1) away from said one strap-engaging member to accommodate the feeding of said upper strap portion between said one strap-engaging member and said other strap-engaging member, (2) toward said one strap-engaging member to urge said upper strap portion against said one strap-engaging member during tensioning of said strap loop, (3) away from said one strap-engaging member to accommodate locating said lower strap portion between said upper strap portion and said other strap-engaging member, and (4) toward said one strap-engaging member to press both said strap portions between said one-strap engaging member and said other strap-engaging member, said other strap-engaging member also defining a strap length receiving region below at least a portion of said other strap-engaging member for at least temporarily accommodating said lower strap portion.

4. The apparatus in accordance with claim 3 in which said loop gripper means includes a loop gripper and a loop gripper moving means for (1) moving said loop gripper toward said anvil to grip said lower and upper strap portions between said anvil and said loop gripper after said loop has been tensioned and (2) moving said loop gripper away from said anvil to release said lower and upper strap portions between about 50 milliseconds and about 60 milliseconds after disengagment is effected between said one strap-engaging member and said upper strap portion.

5. The apparatus in accordance with claim 1
in which said apparatus includes an anvil defining a downwardly directed strap-engaging surface; and
in which said one strap-engaging member is a weld plate mounted in said anvil and defining a downwardly strap-engaging surface recessed relative to said anvil strap-engaging surface.

6. The apparatus in accordance with claim 5 in which said member moving means includes means for oscillating said weld plate in said anvil transversely of the lengths of said strap portions at a frequency between about 330 hertz and about 400 hertz at an amplitude of between about 1 mm. and about 2 mm. for between about 100 milliseconds and about 150 milliseconds.

7. The apparatus in accordance with claim 1
in which each said strap-engaging member has a strap contacting surface;
in which the length of the strap contacting surface of said other strap-engaging member is less than the length of the strap contacting surface of said one strap engaging member, the length of each said strap contacting surface being measured parallel to the direction of the strap length; and
in which said strap contacting surface of said other strap-engaging member terminates at one end in a chamfer that is angled away from the strap contacting surface.

8. Apparatus for producing a welding joint between two overlapping portions of thermoplastic strap, said apparatus comprising:
(A) two strap-engaging members between which said strap portions can be positioned;
(B) closing means for effecting relative movement between said two strap-engaging members to engage said strap portions and force said strap portions into face-to-face contact under pressure at an interface region;
(C) means for heating said strap portions at said interface region sufficiently to melt at least part of the thickness of each strap portion at said interface region; and
(D) opening means for effecting relative movement between said two strap-engaging members to release said pressure on said strap portions while said parts of said strap portions are molten whereby said strap portions at said interface region subsequently solidify in the absence of pressure from said strap-engaging members to form said welded joint.

9. The apparatus in accordance with claim 8
in which said heating means includes means for oscillating one of said strap-engaging members in contact with one of said strap portions to effect relative bodily sliding movement between said strap portions whereby at least part of the thickness of each said strap portion melts at said interface region; and
in which said opening means includes means for effecting relative movement between said two strap-engaging members to effect release of said pressure on said strap portions and to effect disengagement between at least said one strap-engaging member and said one strap portion during the oscillation of said one strap-engaging member while said parts of said strap portions are molten.

10. The apparatus in accordance with claim 9 in which said closing means and said opening means include an actuator that is associated with said other strap-engaging member and that functions as both said closing and opening means to move said other strap-engaging member alternately toward and away from said one strap-engaging member.

11. The apparatus in accordance with claim 8 for producing a welded joint between two overlapping portions of thermoplastic strap wherein said strap has, at least at said interface region, some material which exists as a gas when said strap portions are melted under pressure, and wherein said heating means includes means for increasing the energy in said strap portions at said interface region sufficiently to produce gaseous bubbles of said material at least in said melted part of each said strap portion whereby said strap portions at said interface region subsequently solidify in the absence of pressure from said strap-engaging members to form said welded joint which contains residual bubbles of said material.

12. A method for producing a welded joint between two overlapping portions of thermoplastic strap, said method comprising the steps of:
(A) positioning said overlapping strap portions between two strap-engaging members;
(B) effecting relative movement between said two strap-engaging members to engage said strap portions and force said strap portions into face-to-face contact under pressure at an interface region;
(C) moving one of said strap-engaging members while in contact with one of said strap portions to effect relative bodily sliding movement between said strap portions whereby at least part of the thickness of each strap portion melts at said interface region; and
(D) effecting relative movement between said two strap-engaging members to release said pressure on said strap portions and to effect disengagement between at least said one strap-engaging member and said one strap portion during step (C) while said parts of said strap portions are molten whereby said strap portions at said interface region subsequently solidify in the absence of pressure from said strap-engaging members to form said welded joint.

13. The method in accordance with claim 12 in which step (B) includes moving said other strap-engaging member to press both said strap portions between said other strap-engaging member and said one strap-engaging member with a pressure between about 5.2 megapascals and about 6.9 megapascals while effecting step (C).

14. The method in accordance with claim 12
in which the method includes the additional steps, before step (A), of first forming said strap into a loop that is tensioned around an object and that has said overlapping strap portions and then gripping said overlapping strap portions adjacent said strap-engaging members;

in which step (C) includes oscillating said one strap-engaging member transversely of the lengths of said strap portions at a frequency between about 330 hertz and about 400 hertz at an amplitude of between about 1 mm. and about 2 mm. for between about 100 milliseconds and about 200 milliseconds; and in which the method includes the additional step of terminating the gripping of said strap portions adjacent said strap-engaging members between about 50 milliseconds and about 60 milliseconds after step (D).

15. A method for producing a welded joint between two overlapping portions of thermoplastic strap, said method comprising the steps of:

(A) positioning said overlapping strap portions between two strap-engaging members;

(B) effecting relative movement between said two strap-engaging members to engage said strap portions and force said strap portions into face-to-face contact under pressure at an interface region;

(C) increasing the temperature of said strap portions at said interface region sufficiently to melt at least part of the thickness of each strap portion at said interface region; and (D) effecting relative movement between said two strap-engaging members to release said pressure on said strap portions while said parts of said strap portions are molten whereby said strap portions at said interface region subsequently solidify in the absence of pressure from said strap-engaging members to form said welded joint.

16. The method in accordance with claim 15 in which step (C) includes oscillating one of said strap-engaging members in contact with one of said strap portions to effect relative bodily sliding movement between said strap portions whereby at least part of the thickness of each said strap portion melts at said interface region; and in which step (D) includes effecting relative movement between said two strap-engaging members to effect release of said pressure on said strap portions and to effect disengagement between at least said one strap-engaging member and said one strap portion during the oscillation of said one strap-engaging member while said parts of said strap portions are molten.

17. The method in accordance with claim 15 in which said method further includes providing said strap in a form which, at least at said interface region, has some material which exists as a gas when said strap portions are melted under pressure as set forth in steps (B) and (C); and in which step (C) includes increasing the temperature of said strap portions at said interface region sufficiently to produce gaseous bubbles of said material at least in said melted part of each said strap portion whereby said strap portions at said interface region subsequently solidify in the absence of pressure from said strap-engaging members to form said welded joint which contains residual bubbles of said material.

18. The method in accordance with claim 17 in which said method includes providing said strap in the form of a polyester strap.

19. The method in accordance with claim 15 in which step (B) includes forcing said strap portions into contact under a pressure between about 5.2 megapascals and about 6.9 megapascals.

20. A method for producing a welded joint between two overlapping portions of thermoplastic strap which each have at least one face, said method comprising the steps of:

(A) forcing said strap portions into face-to-face contact under pressure;

(B) during or before step (A), increasing the temperature of said strap portions so as to melt at least part of the thickness of each strap portion at the contacting face of each said strap portion and forming a plurality of cavities that are distributed across the width of the melted parts adjacent the ends of the melted parts and that are entirely surrounded by the melted parts; and (C) terminating steps (A) and (B) before the melted parts solidify whereby said strap portions at said interface region subsequently solidify to encapsulate the cavities and form said welded joint.

* * * * *